United States Patent [19]

Rockwood et al.

[11] Patent Number: 5,035,436

[45] Date of Patent: Jul. 30, 1991

[54] HOUSING SEAL CHAMBER BODY

[75] Inventors: Robert E. Rockwood, Windham, N.H.; Henry S. Duffee; James M. Downing, both of Florence, S.C.

[73] Assignee: Five Star Seal Corporation, Florence, S.C.

[21] Appl. No.: 513,889

[22] Filed: Apr. 24, 1990

[51] Int. Cl.⁵ ............................................. F16J 15/16
[52] U.S. Cl. ...................................... 277/25; 277/24; 277/68; 277/70; 277/71; 277/79; 277/168
[58] Field of Search ...................... 277/24, 53, 58, 67, 277/70, 71, 78, 79, 133, 134, 168, 170, 171, 25, 68

[56]         References Cited
      U.S. PATENT DOCUMENTS

| | | | |
|---|---|---|---|
| 1,873,267 | 8/1932 | Bigelow et al. | |
| 1,876,515 | 9/1932 | Emmet | 277/70 |
| 2,824,759 | 2/1958 | Tracy | |
| 2,846,245 | 8/1958 | Weaver | |
| 2,852,284 | 9/1958 | Bryson | 277/68 |
| 2,912,264 | 11/1959 | Peck | 277/58 |
| 2,983,529 | 5/1961 | Price | 277/168 |
| 3,854,732 | 12/1974 | Franz et al. | 277/58 |
| 4,190,538 | 2/1980 | Chen | 277/24 X |
| 4,402,515 | 9/1983 | Malott | 277/67 X |
| 4,471,963 | 9/1984 | Airhart | |
| 4,531,746 | 7/1985 | Amdall et al. | |

FOREIGN PATENT DOCUMENTS 1914961 10/1969 Fed. Rep. of Germany ........ 277/25
0128567  8/1983 Japan ..................................... 277/25

Primary Examiner—William A. Cuchlinski, Jr.
Assistant Examiner—James K. Folker
Attorney, Agent, or Firm—Fleit, Jacobson, Cohn, Price, Holman & Stern

[57] ABSTRACT

A seal chamber housing is provided for equipment with rotating shafts and includes a stepped conical bore open at the pumping mechanism end. The bore defines a seal chamber affording greater volume about the associated mechanical seals and a tapered bushing is optionally sealingly seated in the large diameter end of the stepped conical bore for excluding pump fluid from the seal chamber and/or preventing loss of seal flush liquid from within the seal chamber. In addition, the seal chamber includes upper and lower vent and drain ports primarily for use when the optional bushing is in place and said chamber also includes flushing fluid ports, a closed temperature-controlling external fluid channel and external air cooling features, all of which coact in various operating environments to provide longer and more efficient mechanical seal life.

9 Claims, 1 Drawing Sheet

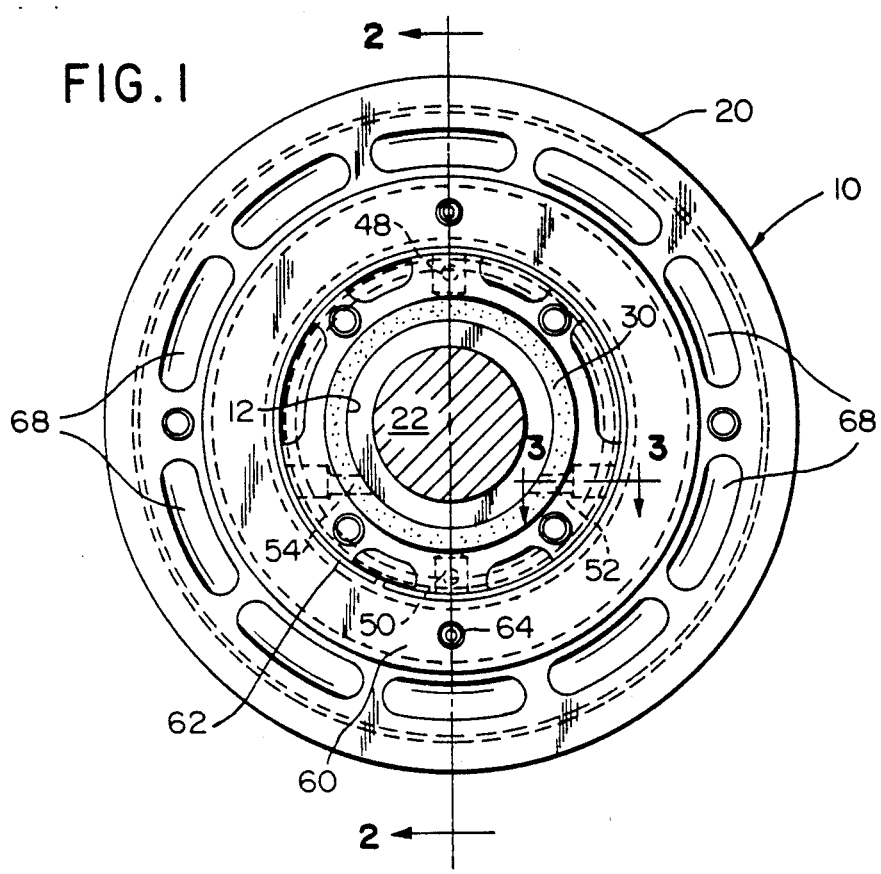
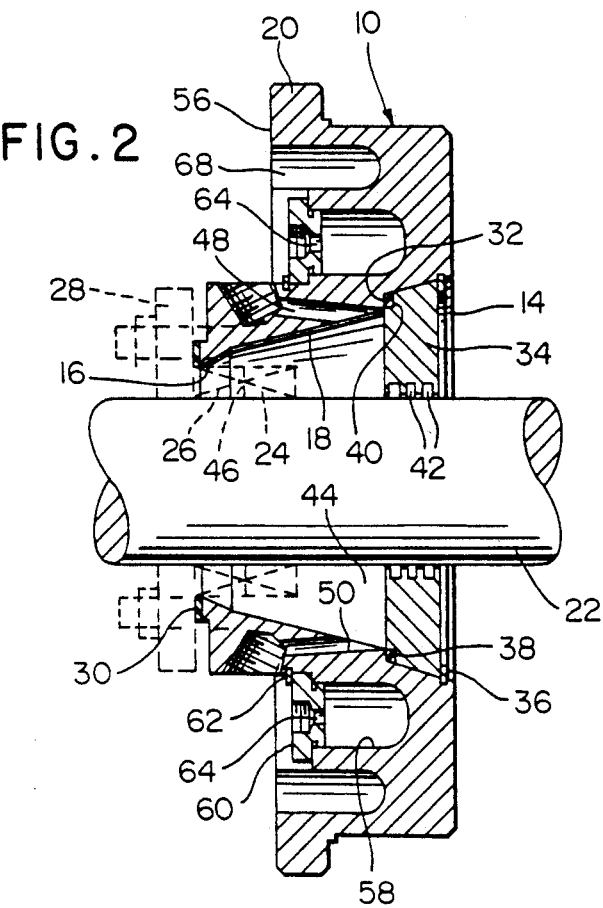
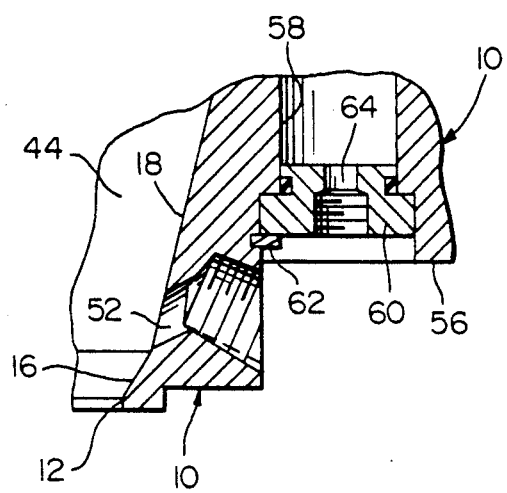

5,035,436

HOUSING SEAL CHAMBER BODY

BACKGROUND OF THE INVENTION

1. Field of the Invention

This invention relates to a seal chamber housing for a pump shaft and including structure for substantially closing the inner end of the seal chamber against the movement of pumped fluid thereinto. The seal chamber additionally includes structure which provides for additional chamber volume about co-acting stationary and rotating seal components in the outer end of the chamber, venting and draining of the seal chamber, flushing of the seal chamber as required, air cooling of the seal chamber body and/or liquid cooling (or heating) of the seal chamber body about the seal chamber, and provisions for monitoring operating temperatures of the chamber housing, all of which features are provided to extend the operating life of the stationary and rotary seal components in the outer portion of the seal chamber under various operating conditions.

2. Description of the Related Art

Various different forms of cooling arrangements, labyrinth fluid seals and forced air cooling of seal chamber bodies heretofore have been provided such as those disclosed in U.S. Pat. Nos. 1,873,267, 2,824,759, 2,846,245, 4,471,963 4,531,746. However, these previously known structures do not include the combination of structural and operational features of the instant invention.

SUMMARY OF THE INVENTION

The seal chamber housing of the instant invention includes a central opening therethrough for receiving a rotary pump shaft and the opening includes a fluid end portion, an atmosphere end portion and an optional intermediate length mid-portion disposed between the fluid and atmosphere end portions. The fluid portion tapers toward the atmosphere end portions and terminates in an optional radially, inwardly projecting annular shoulder and the mid-portion also tapers toward the atmosphere end portion from adjacent the inner periphery of the shoulder and the outer end portion tapers away from the fluid end portion at a greater angle than the taper of the mid-portion and/or the fluid end portion.

An optional tapered annular bushing may be seated within the fluid end portion of the opening and the inner periphery thereof may define a labyrinth seal. The more greatly tapered atmosphere end portion of the opening and the adjacent end of the mid-portion of the opening are adapted to receive co-acting stationary and rotary seals, respectively, therein and the chamber has vent and drain ports opening thereinto at the major diameter end of the mid-portion of the opening and flushing ports opening thereinto at the minor diameter end of the mid-portion of the opening in directions inclined toward the atmosphere end portion. Also, a liquid cooling channel extends about outer side of the chamber body about the fluid end portion and mid-portion of the opening and air cooling structure is provided on the outer side of the chamber body outwardly of the aforementioned channel.

The main object of this invention is to provide a seal chamber for containing co-acting stationary and rotary seal components and designed to greatly extend the operation life of the stationary and rotary seal components.

A further object of this invention is to provide a seal chamber designed specifically to provide appreciably greater chamber volume about the stationary and rotary seal components therein for more effective cooling and cleaning of the seal components.

Another object of this invention is to provide a seal chamber housing including external air cooling structure for atmospheric cooling of the chamber housing for applications not requiring the more intensive cooling provided by an external fluid cooling system.

Still another important object of this invention is to provide a seal chamber housing incorporating an external fluid cooling (or heating) channel therein for external fluid cooling (or heating) of the chamber body for applications requiring enhanced cooling or applications requiring heating of the housing and enclosed chamber contents.

Yet another object of this invention is to provide a seal chamber including structure designed to greatly facilitate flushing of the seal chamber in an area thereof disposed about the stationary and rotary seal components.

Another object of this invention is to provide an optional bushing for substantially closing the inner end of the tapered seal chamber against the entrance of a pumped fluid therein and/or against the loss of seal flush liquid from within the chamber volume.

Another important object of this invention is to provide a seal chamber which may be readily vented and drained when the optional bushing is utilized.

A final object of this invention to be specifically enumerated herein is to provide a seal chamber housing in accordance with the preceding objects and which will conform to conventional forms of manufacture, be of simple construction and dependable in operation so as to provide a device that will be economically feasible, long-lasting and relatively trouble free.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front elevational view of the preferred form of the seal chamber housing of the instant invention as seen from the outer side thereof;

FIG. 2 is an enlarged fragmentary vertical sectional view taking substantially upon the plane indicated by the section line 2—2 of FIG. 1; and FIG. 3 is a further enlarged fragmentary horizontal sectional view taking substantially upon the plane indicated by the section line 3—3 of FIG. 1.

DESCRIPTION OF THE PREFERRED INVENTION

Referring now more specifically to the drawings the numeral 10 generally designates the seal chamber housing of the instant invention.

The body 10 is annular in configuration and defines a central opening 12 extending therethrough including fluid and atmosphere end portions 14 and 16 and an intermediate length mid-portion 18.

The outer periphery of the body 10 defines an abutment flange 20 for abutting against and sealed engagement with a pump body casing and the opening 12 receives an associated pump shaft 22 therethrough. Co-acting rotating and stationary seal components 24 and 26 are to be used in forming a seal between the shaft 22 and a gland 28 removably secured to the outer side of the body 10 against an annular gasket 30 disposed between the gland 28 and the body 10, the seal components 24 and 26 being secured to the gland 28 and shaft 22, respectively, in any convenient manner.

The fluid end portion 14 is tapers toward the atmosphere end portion 16 and terminates at a radially, inwardly projecting abutment shoulder 32 and the mid-length portion 18 also tapers toward the atmosphere end portion 16 at substantially the same angle as the fluid end portion 14.

An optional tapered bushing 34 may be removably seated within the fluid end portion 14 through the utilization of a snap ring 36 and the outer periphery of the minor diameter end of the bushing 34 includes a rabbet 38 in which an O-ring 40 is received forming a fluid tight seal between the bushing 34 and the fluid end portion 14 of the opening 10. The seating of the bushing 34 within the atmosphere end portion 14 of the opening 12 enables the O-ring seal 40 to form a proper seal without any chance of the O-ring seal 40 being over compressed.

The inner periphery of the annular bushing 34 may be provided with labyrinth grooves 42 which are operative to substantially block the seal chamber 44 defined by the atmosphere end portion and the mid-portion of the opening 12 against the entrance of pumped fluid therein and/or against loss of seal flush liquid from within.

The greater taper of the atmosphere end portion 16 of the opening 12 provides for considerably greater chamber volume extending about the interface 46 between the seal components 24 and 26 thereby enabling greater cooling thereof by fluid within the chamber 44.

Upper and lower vent and drain ports 48 and 50 open into the major diameter end portion of the mid-portion 44 of the opening 16 at the upper and lower peripheries, respectively, thereof and may be utilized to drain and/or vent fluids from the chamber 44. The outer portions of the ports 48 and 50 include pipe thread equipped counterbores whereby the ports 48 and 50 may be plugged or have threaded pipe fittings operatively engaged therein.

In addition, circulation ports 52 and 54 open into the minor diameter end portion of the mid-portion 18 of the opening 12 in a direction inclined toward the atmosphere end portion 16 of the opening 12 to provide a spiral flow of flush liquid around interface 46 for optimum cooling, cleaning, and lubricating of seal components 24 and 26. The ports 52 and 54 also include pipe thread equipped outer end large counterbores. Suitable flushing liquids may be pumped into the chamber 44 via either (or both) of the ports 52 and 54.

It will be noted from FIG. 1 of the drawings that the pipe-threaded counterbores of ports 52 and 54 are disposed upon a chord of the opening 12. Further, the body 10 may also be mounted in a 180° angularly displaced position such that the ports 50 and 48 are disposed uppermost and lowermost, respectively, and the ports 52 and 54 will be disposed above the center axis of the opening 12 as opposed to below the center axis of the opening 12. This unique placement of ports 48, 50, 52, and 54 provides for improved accessability to ports 52 and 54 when required.

The atmosphere side 56 of the body 10 includes an annular outwardly opening cooling channel 58 formed therein and the outer extrememity of the cooling channel 58 is removably closed by a double O-ring equipped annular closure plate 60 removably secured over the open outer side of the cooling channel 58 by the utilization of a snap ring 62. The closure plate 60 includes fluid circulation ports 64 formed therethrough by which cooling (or heating) fluid may be caused to flow through the chamber 58. Further, from a comparison of FIGS. 1 and 2, it may be seen that the outer side 56 of the body 10 is provided with circumferentially spaced outer periphery air cooling recesses 68.

Because the mid-portion 18 of the opening 12 is tapered at a shallow angle and the atmosphere end portion 16 is tapered away from the mid-portion 18 at a sharper angle than the taper of the mid-portion or fluid end portion, appreciably more volume of the chamber 44 is disposed about the plane of the interface 46 between the seal components 24 and 26. Thus, a greater flushing action of the seal interface area and cooling action thereon is enabled.

The diametrically opposite ports 48 and 50 may be used for venting and draining the chamber 44, when desired and the ports 52 and 54 may be used for flushing the chamber 44 and, in particular, the area of the chamber 44 which is disposed in the plane of the interface 46 between the seal components 24 and 26. Still further, fluid cooling of the body 10 immediately about the chamber 44 may be effected by passing cooling fluid through the ports 64 and the chamber 58, or such fluid may be used for heating purposes, if desired. Also, the recesses 68 provide for ambient air cooling of the outer periphery of the body 10.

It is also pointed out that the stepped conical opening 12, and particularly the mid-portion 18 and atmosphere end portion 16 thereof, supports a discontinuous vortexing action of the liquid within the chamber 44 to promote cooling and to provide for removal or reduction of solids or debris from around the plane of the interface 46 of the seal components 24 and 26. These solids may then be drained via port 50 (or 48) when the optional bushing 34 is in place. When optional bushing 34 is not inserted, this said vortexing action is continued and completed along the fluid end portion 14 thus removing solids or debris into the pumping mechanism for removal from the pump via the pump discharge.

A chamber having a single surface with, for example, a constant taper would generally form a continuous vortex resulting in higher fluid velocities causing abrasive particles in the fluid to spin at these higher velocities against the OD wall of the chamber causing premature wear. In addition, one continuous vortex would generally create a higher vacuum situation at the vortex center resulting in poor lubrication and dry running of the seal faces because of the naturally occurring pressure depression at the center.

The present invention with stepped surfaces and changing tapers, on the other hand, results in a discontinuous vortex or multiple vortices which force the entrained particles away from the seal faces to the radial outer wall of the chamber, but at lower velocities resulting in less wear.

In addition, a discontinuous vortex or multiple vortices result in a less intense vacuum situation in the vicinity of the seal faces reducing the possibility of dry running.

Also, as previously herein before set forth, the stepped conical opening 12 insures maximum liquid volume around the mating faces of the seal components 24 and 26, thus providing a proper heat sink for cooling of the mechanical seal faces and the provision of the chamber 58 and the cover plate 60 enable positive and precisely controlled cooling (or heating) of the area of the body 10 defining chamber 44.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A seal chamber housing including inboard and outboard sides and a central annular body defining a central opening extending therethrough for receiving a rotary shaft, said opening including a fluid end portion and an atmosphere end portion, said fluid end portion tapering toward the atmosphere end portion of the opening, said atmosphere end portion tapering away from said fluid end portion at a greater taper angle than that of said fluid end portion, said atmosphere end portion and said fluid end portion include co-acting stationary and rotary seal components disposed radially inwardly and operatively associated with said shaft.

2. The seal chamber housing of claim 1 including a tapered annular bushing removably seated within said fluid end portion, annular seal means operatively associated with said bushing and fluid end portion forming a fluid tight seal therebetween, said housing including upper and lower vent and drain ports formed therethrough including inner ends thereof opening into the largest diameter of said fluid end portion at the upper and lower peripheries thereof closely inward of the minimum diameter end of said bushing, said ports including outer ends thereof opening outwardly through the outboard side of said housing.

3. The seal chamber housing of claim 1 including an outwardly opening annular channel formed in the outboard side of said housing and of a diameter larger than the diameter of said fluid end portion, an annular closure plate removably closable over said channel and including fluid inlet and fluid outlet openings formed therethrough opening into said channel from the outboard side of said body and through which temperature controlled fluid may be admitted into and discharged from said channel.

4. The seal chamber housing of claim 2 including an outwardly opening annular channel formed in the outboard side of said housing and of a diameter larger than the diameter of said fluid end portion, an annular closure plate removably closable over said channel and including fluid inlet and fluid outlet openings formed therethrough opening into said channel from the outboard side of said body and through which temperature controlled fluid may be admitted into and discharged from said channel.

5. The seal chamber housing of claim 1 wherein said housing includes flushing ports formed therethrough having selectively openable and closable outer ends opening outwardly through said outboard side and inner ends opening into the minor diameter portion of said fluid end portion at an angle inclined toward said atmosphere end portion, said flushing ports having their inner ends opening into said fluid end portion at opposite ends of and inwardly along a chord of said opening.

6. The seal chamber housing of claim 2 wherein said housing includes flushing ports formed therethrough having selectively openable and closable outer ends opening outwardly through said outboard side and inner ends opening into the minor diameter portion of said fluid end portion at an angle inclined toward said atmosphere end portion, said flushing ports have their inner ends opening into said fluid end portion at opposite ends of and inwardly along a chord of said opening.

7. The seal chamber housing of claim 3 wherein said housing includes flushing ports formed therethrough having selectively openable and closable outer ends opening outwardly through said outboard side and inner ends opening into the minor diameter portion of said fluid end portion at an angle inclined toward said atmosphere end portion, said flushing ports having their inner ends opening into said fluid end portion at opposite ends of and inwardly along a chord of said opening.

8. The seal chamber housing of claim 4 wherein said housing includes flushing ports formed therethrough having selectively openable and closable outer ends opening outwardly through said outboard side and inner ends opening into the minor diameter portion of said fluid end portion at an angle inclined toward said atmosphere end portion, said flushing ports having their inner ends opening into said fluid end portion at opposite ends of and inwardly along a chord of said opening.

9. The seal chamber housing of claim 2 wherein said fluid end portion includes an portion thereof adjacent said atmosphere end portion defining an intermediate portion of said opening, the inner extremity of said intermediate portion terminating at a radially outwardly projecting annular shoulder against which the minor diameter end of said annular bushing is seated.

* * * * *